United States Patent Office 3,331,539
Patented July 18, 1967

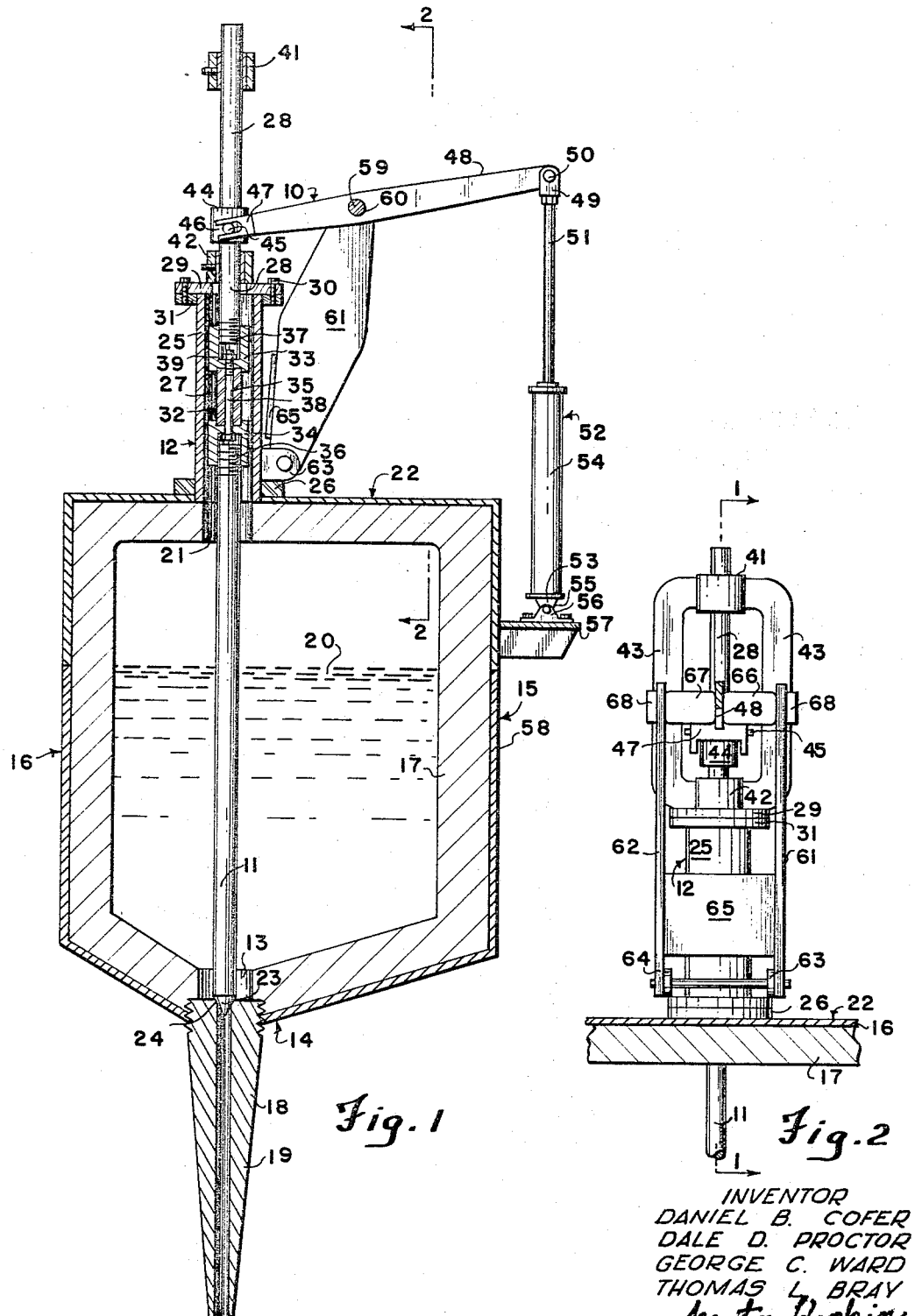

3,331,539
METERING DEVICE FOR CONTROLLING MOLTEN METAL FLOW
Daniel B. Cofer, Dale D. Proctor, and George C. Ward, Carrollton, Ga., and Thomas L. Bray, Birmingham, Ala., assignors to Southwire Company, Carrollton, Ga., a corporation of Georgia
Filed Sept. 8, 1966, Ser. No. 578,003
10 Claims. (Cl. 222—504)

ABSTRACT OF THE DISCLOSURE

What is disclosed herein is a metering device for controlling the flow of a molten metal from a vessel which includes a metallic metering pin that extends into the molten metal to open and close an orifice in the vessel by its motion, a positioning means for positioning the metering pin relative to the orifice by motion along the centerline of the metering pin, and a linking means for linking the metering pin and the positioning means so that heat is not transferred from the metering pin to the positioning means. The linking means is disclosed as including a linking member which is of a material which does not readily transfer heat, which is slidably movable within a sleeve mounted on the vessel, and which operatively connects in spaced relation the metering pin and a rod of the positioning means. In addition to the rod, the positioning means includes a lever member which slidably engages lugs extending from the rod and which is pivotable about a pivotably mounted pivot shaft by a pivotably mounted actuator unit.

---

This invention relates to controlling the flow of molten metal and more particularly to a metering device for controlling the flow of molten metal from a tundish or other vessel into a mold.

It is a requirement in the casting of a molten metal that the flow of molten metal into a mold be controlled to insure that various operating conditions relating to mold size, available coolant, and other factors are met. This requirement is particularly critical in the continuous casting of molten metal since the mold generally moves relative to the source of molten metal so that the flow of molten metal into the mold must be carefully controlled to provide the proper coordination between the flow of molten metal and the motion of the mold. As a result, a variety of metering devices for controlling the flow of molten metal from a tundish or other vessel into a mold have been used in the prior art.

A difficulty with these prior art metering devices is that they have been generally difficult to maintain in proper operating condition and have frequently had relatively short useful lives. This is because a metering device for controlling the flow of molten metal must be in close proximity to the molten metal in order to regulate the flow of molten metal and because the heat of the molten metal has generally caused prior art metering devices to be susceptible to mechanical failure. This difficulty with prior art metering devices has only been partially avoided when materials having an extreme degree of resistance to damage by heat have been extensively used in their manufacture. Moreover, when such materials have been used, prior art metering devices have been relatively expensive to manufacture because such materials are relatively expensive and difficult to use.

The invention disclosed herein overcomes these and other difficulties encountered with prior art metering devices in that it provides a metering device which permits the flow of molten metal to be carefully controlled, which is relatively inexpensive to manufacture, which is not difficult to maintain, and which has a relatively long useful life. These improvements in a metering device are provided by a metering device in which the position of a metering pin serves to control the flow of molten metal, in which a relatively simple and reliable positioning means is used to move and position the metering pin, and in which the positioning means is substantially isolated from the heat of the molten metal by a linking means. The nature of the positioning means and the substantial isolation of the positioning means from the molten metal by the linking means serve to provide a metering device which does not require the extensive use of relatively expensive materials having an extreme degree of resistance to damage by heat in its manufacture, but which nevertheless is not susceptible to mechanical failure because of the heat of molten metal.

These and other features and advantages of the invention will be more clearly understood from the following detailed description and the accompanying drawing in which like characters of reference designate corresponding parts throughout and in which:

FIG. 1 is a cross sectional view of a metering device embodying the invention disclosed herein taken substantially in line 1—1 in FIG. 2 and shows the metering device positioned on a vessel which is also shown in the cross section.

FIG. 2 is a cross sectional view of the metering device shown in FIG. 1 taken substantially in line 2—2 in FIG. 1.

These figures and the following detailed description disclose a specific embodiment of the invention but the invention is not limited to the details disclosed since it may be embodied in other equivalent forms.

The invention disclosed herein is best understood as a metering device 10 including a metering pin 11 and a positioning means 12 for positioning the metering pin 11 relative to an orifice 13 in the bottom 14 of a tundish or vessel 15. The vessel 15 comprises a rigid wall 16 and a liner 17 of refractory material. A pouring spout 18 is threadably received in the bottom 14 of the vessel 15 and has a channel 19 continuous with the orifice 13 in the bottom 14 of the vessel 15. It will be understood that molten metal 20 in the vessel 15 flows into a mold (not shown) through the orifice 13 and the channel 19.

The metering pin 11 extends into the interior of the vessel 15 through an orifice 21 in the top 22 of the vessel 15 and is positioned by the positioning means 12 with its center line substantially coinciding with the center line of the channel 19 in the pouring spout 18. The lower end of the metering pin 11 has a conical tip 23 which is shaped to be received in a conical recess 24 at the upper end of the channel 19 of the pouring spout 18 and it will now be understood that the position of the metering pin 11 along its center line relative to the recess 24 at the upper end of the channel 19 determines the rate of flow of molten metal 20 from the vessel 15. Moreover, it will also be understood that changing the position of the metering pin 11 along its center line relative to the recess 24 serves to change the flow of molten metal 20 from the vessel 15 and to provide for that controlled flow of the molten metal 20 which is required of a metering device 10.

It is the positioning means 12 which serves to position and change the position of the metering pin 11 relative to the recess 24 and the positioning means 12 includes a vertical sleeve 25 having a flange 26 at its lower end by which sleeve 25 is attached to the top 22 of the vessel 15. The sleeve 25 extends upwardly from the top 22 of the vessel 15 with the center line of its hollow interior 27 substantially coinciding with the center lines of the metering pin 11 and the orifice 21 in the top 22 of the vessel 15.

The lower end of a positioning rod 28 is inserted into the upper end of the sleeve 25 through a hole 29' in a plate 29 attached by bolts 30 to a flange 31 at the upper end of the sleeve 25. Within the sleeve 25, the metering pin 11 and the positioning rod 28 are joined by a linking means such as the linking member 32.

In that embodiment of the invention disclosed herein, the linking member 32 comprises an upper disc 33 and a lower disc 34 having a cylinder 35 extending between them. The lower disc 34 has a threaded recess 36 which threadably receives the threaded upper end of the metering pin 11 and the upper disc 33 has a threaded recess 37 which threadably receives the lower end of the positioning rod 28. The upper disc 33, the lower disc 34, and the cylinder 35 are fixedly positioned relative to each other to provide an integral linking member 32 by extending a bolt 38 from the recess 36 in the lower disc 34 through the cylinder 35 to the recess 37 in the upper disc 33 and by threadably engaging the upper end of the bolt 38 with a nut 39.

The upper disc 33 and the lower disc 34 each have a diameter which is just slightly less than the diameter of the hollow interior 27 of the sleeve 25 and the cylinder 35 has a diameter less than that of the upper disc 33. Thus, it will now be understood that the upper disc 33, the lower disc 34, and the cylinder 35 provide a linking member 32 which is slidably movable within the sleeve 25 along the centerline of the sleeve 25. It will also be understood that the metering pin 11 may be conveniently replaced simply by rotating it about its centerline.

In addition, the upper disc 33, the lower disc 34, and cylinder 35 are formed of a material which does not readily transfer heat such as any one of a variety of ceramic materials which will be readily apparent to those skilled in the art. Moreover, the recess 36 in the lower disc 34 and the recess 37 in the upper disc 33 are both sufficiently deep for the bolt 38 to not engage either the metering pin 11 or the positioning rod 28. Thus, the linking means provided by the linking member 32 not only serves as a means for operatively connecting the positioning rod 28 with the metering pin 11 but also as a means for limiting or substantially preventing the transfer of heat from the metering pin 11 to the positioning rod 28 or to the sleeve 25 by spacing the metering pin 11 from the positioning rod 28 and the sleeve 25 with a material which does not readily transfer heat.

The linking member 32 also serves to insure that motion of the metering pin 11 is along the longitudinal centerline of the metering pin 11 and in that embodiment of the invention disclosed herein, a guide member 40 having an upper guide sleeve 41 and a lower guide sleeve 42 through which the upper end of the positioning rod 28 slidably extends serves further to insure that both the metering pin 11 and positioning rod 28 move along the centerline of the metering pin 11. The upper guide sleeve 41 and the lower guide sleeve 42 are joined by side members 43 and the guide member 40 is positioned on the plate 29 so as to maintain the guide sleeves 41 and 42 in position.

Fixedly position on the positioning rod 28 between the upper guide sleeve 41 and the lower guide sleeve 42 is a collar 44 having lugs 45 slidably received in slots 46 in the forked end 47 of a lever member 48. That end of the lever member 48 remote from the collar 44 is pivotably attached to a yoke 49 by a hinge pin 50. The yoke 49 is fixedly attached to the upper end of the plunger 51 of an actuator unit 52 having a tab 53 at the lower end of its cylinder 54 by which the actuator unit 52 is pivotably attached by a hinge pin 55 to a tab 56 attached to a platform 57 mounted on a side 58 of the vessel 15.

The lever member 48 has a hole 59 through which is inserted a pivot shaft 60 extending between a pivot plate 61 and a pivot plate 62. The lower end of the pivot plate 61 is pivotably attached with a hinge bolt 61' to a tab 63 mounted on the flange 26 of the sleeve 25 and the lower end of the pivot plate 62 is pivotably attached with a hinge bolt 62' to a tab 64 mounted on the flange 26 of the sleeve 25. The pivot plate 61 and the pivot plate 62 are maintained in special parallel relationship to each other by a spacing plate 65 and by a spacer sleeve 66 on the pivot shaft 60 between the lever member 48 and the pivot plate 61 and a spacer sleeve 67 on the pivot shaft 60 between the lever member 48 and the pivot plate 62. Lateral movement of the pivot plates 61 and 62 outwardly along the pivot shaft 60 is prevented by both the spacing plate 65 and by lock nuts 68 at the outer ends of the pivot shaft 60.

It will be understood that with both the pivot plates 61 and 62 and the actuator unit 52 pivotably mounted, the pivot shaft 60 is movable along the arc of circle having the hinge bolts 61' and 62' as its center. It will also be understood by those skilled in the art that the actuator unit 52 is a conventional in that the application of either pneumatic or hydraulic pressure from a convenient source (not shown) causes the plunger 51 to move into or out of the cylinder 54 of the actuator unit 52. It will also be understood that motion of the plunger 51 causes the lever member 48 to pivot about the pivot shaft 60 which in turn serves to raise or lower the positioning rod 28 and the metering pin 11.

The forked end 47 of the lever member 48 is both pivotably and slidably attached to the collar 44. Thus, both the slidable motion of the lever member 48 relative to the collar 44 which is provided by the slots 46 in the forked end 47 of the lever member 48 and the motion of the pivot shaft 60 along the arc of a circle serve to insure that pivotable motion of the lever member 48 imparts motion to the positioning rod 28 only along its centerline. For example, it will be understood from FIG. 1 that as the plunger 51 moves downward, the pivot shaft 60 moves to the right along the arc of a circle and the lugs 45 move to the right in the slots 46 so that the positioning rod 28 moves upwardly without a component of force transverse to its centerline. Thus, a metering device 10 embodying the invention disclosed herein provides a relatively inexpensive metering device 10 which permits the flow of molten metal 20 to be carefully controlled and which is relatively free of maintenance over a relatively long useful life not only because only the metering pin 11 is exposed to the heat of the molten metal 20 and is readily replaced, but also because of the freedom from jamming and malfunctioning provided by the positioning means 12.

It will be obvious to those skilled in the art that many variations may be made in the embodiments chosen for the purpose of illustrating the present invention without departing from the scope thereof as defined by the appended claims.

What is claimed as invention is:

1. In a metering device for controlling the flow of a molten metal from a vessel through an orifice in said vessel; a metallic pin extending into said vessel from a sleeve positioned on said vessel, said pin being positioned with said vessel so that motion of said pin along its centerline relative to said orifice closes said orifice; a positioning means adjacent said vessel for moving said pin relative to said orifice, said positioning means including a rod extending into said sleeve and movable along its centerline relative to said sleeve, a plurality of lugs extending from said rod, and a lever member pivotable about a movable pivot shaft by an actuator unit and having an end slidably engaging said plurality of lugs; and linking means slidably movable within said sleeve for operatively connecting said pin and said rod within said sleeve while maintaining said pin in spaced relation to said rod and to said sleeve with a material which limits heat transfer.

2. The metering device of claim 1 in which said linking means includes a linking member with an end of said pin and an end of said rod attached in spaced relation.

3. The metering device of claim 2 in which said linking member includes a first disc having a recess for receiving said end of said pin, a second disc having a recess for receiving said end of said rod, and a cylinder joining said first disc and said second disc.

4. The metering device of claim 3 in which said first disc and said second disc are within and slidably engage said sleeve.

5. The metering device of claim 4 including a guide member above said sleeve within which said rod is slidably movable along its centerline.

6. The metering device of claim 1 including a plurality of pivot plates pivotably mounted on a hinge bolt and having said pivot shaft extending between them.

7. The metering device of claim 6 in which said hinge bolt is displaced downwardly from said pivot shaft.

8. The metering device of claim 1 in which said actuator unit includes a plunger movable by a cylinder and pivotably connected to said lever member.

9. The metering device of claim 8 in which said plunger extends upwardly toward said lever member from said cylinder and said cylinder is pivotably mounted.

10. The metering device of claim 8 including connecting means for pivotably connecting said plunger to said lever and in which said pivot shaft is between said connecting means and said end of said lever member slidably engaging said plurality of lugs.

References Cited
UNITED STATES PATENTS

| | | | |
|---|---|---|---|
| 211,953 | 2/1879 | Barnum | 22—85 |
| 521,521 | 6/1894 | Adams | 22—85 |
| 2,668,994 | 2/1954 | Hansen | 22—85 |
| 2,810,169 | 10/1957 | Hofes | 22—85 |

FOREIGN PATENTS

| | | |
|---|---|---|
| 383,946 | 10/1923 | Germany. |

J. SPENCER OVERHOLSER, *Primary Examiner*.

R. D. BALDWIN, *Assistant Examiner*.